United States Patent
Beck, Jr. et al.

(10) Patent No.: US 6,536,493 B2
(45) Date of Patent: Mar. 25, 2003

(54) TIRE WITH COMPOSITE PLY STRUCTURE

(75) Inventors: John Janes Beck, Jr., Lawton, OK (US); Gary Edwin Tubb, Copley, OH (US); John Ronald Abbott, Cuyahoga Falls, OH (US); Samuel Patrick Landers, Uniontown, OH (US); Amit Prakash, Hudson, OH (US); Frederick Forbes Vannan, Jr., Clinton, OH (US); Henry David Broyles, Uniontown, OH (US); Klaus Beer, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/039,946

(22) Filed: Nov. 9, 2001

(65) Prior Publication Data

US 2002/0088551 A1 Jul. 11, 2002

Related U.S. Application Data

(62) Division of application No. 09/627,603, filed on Jul. 28, 2000, now Pat. No. 6,358,346, which is a division of application No. 09/077,646, filed as application No. PCT/US98/05189 on Mar. 13, 1998, now Pat. No. 6,142,205.

(51) Int. Cl.$^7$ .......................... B60C 15/00; B60C 15/06; B60C 17/00
(52) U.S. Cl. ....................... 152/516; 152/517; 152/542; 152/550; 152/552; 152/555
(58) Field of Search ................................ 152/517, 542, 152/550, 552, 555, 516

(56) References Cited

U.S. PATENT DOCUMENTS

| | | |
|---|---|---|
| 1,393,952 A | 10/1921 | Miller |
| 2,430,560 A | 11/1947 | Elliott |
| 3,386,486 A | 6/1968 | Kovac et al. |
| 3,774,663 A | 11/1973 | Montagne |
| 3,902,536 A | 9/1975 | Schmidt |
| 3,946,785 A | 3/1976 | Powers et al. |
| 3,954,131 A | 5/1976 | Hoshino et al. |
| 4,093,014 A | 6/1978 | Tomoda et al. |
| 4,790,366 A | 12/1988 | Kadota |
| 5,427,166 A | 6/1995 | Willard, Jr. |
| 5,435,370 A | 7/1995 | Ahmad et al. |
| 5,509,455 A | 4/1996 | Warchol et al. |
| 5,609,701 A | 3/1997 | Soderberg et al. |
| 5,660,656 A | 8/1997 | Herbelleauu et al. |
| 5,709,760 A | 1/1998 | Prakash et al. |

FOREIGN PATENT DOCUMENTS

| | | |
|---|---|---|
| DE | 915187 C | 7/1954 |
| DE | 19537395 A | 4/1997 |
| DE | 195 37 395 A1 | 4/1997 |
| EP | 0 590 482 A1 | 4/1994 |
| EP | 822105 A2 | 2/1998 |
| GB | 990524 A | 4/1965 |
| WO | WO9707995 A1 | 3/1997 |
| WO | WO97/07995 | 3/1997 |

Primary Examiner—Adrienne C. Johnstone
(74) Attorney, Agent, or Firm—Nancy T. Krawczyk; David E. Wheeler

(57) ABSTRACT

A tire 10 has a composite ply 40. The composite ply 40 has a primary ply 40A reinforced with parallel inextensible cords 41 and a pair of ply extensions 40B having synthetic cords. The method of manufacturing the tire 10 is described. The tire 10 can be made as a runflat type tire.

3 Claims, 9 Drawing Sheets

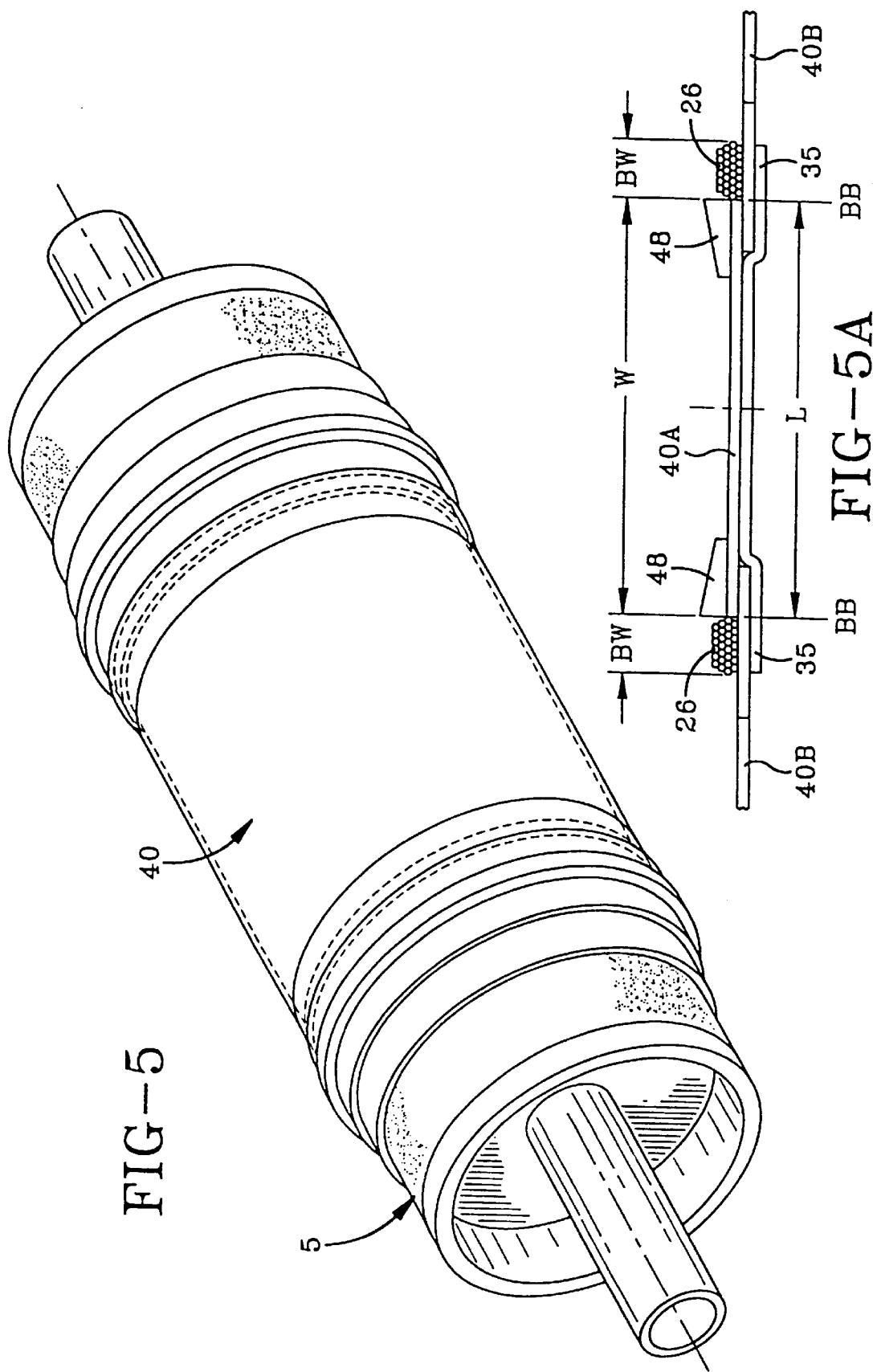

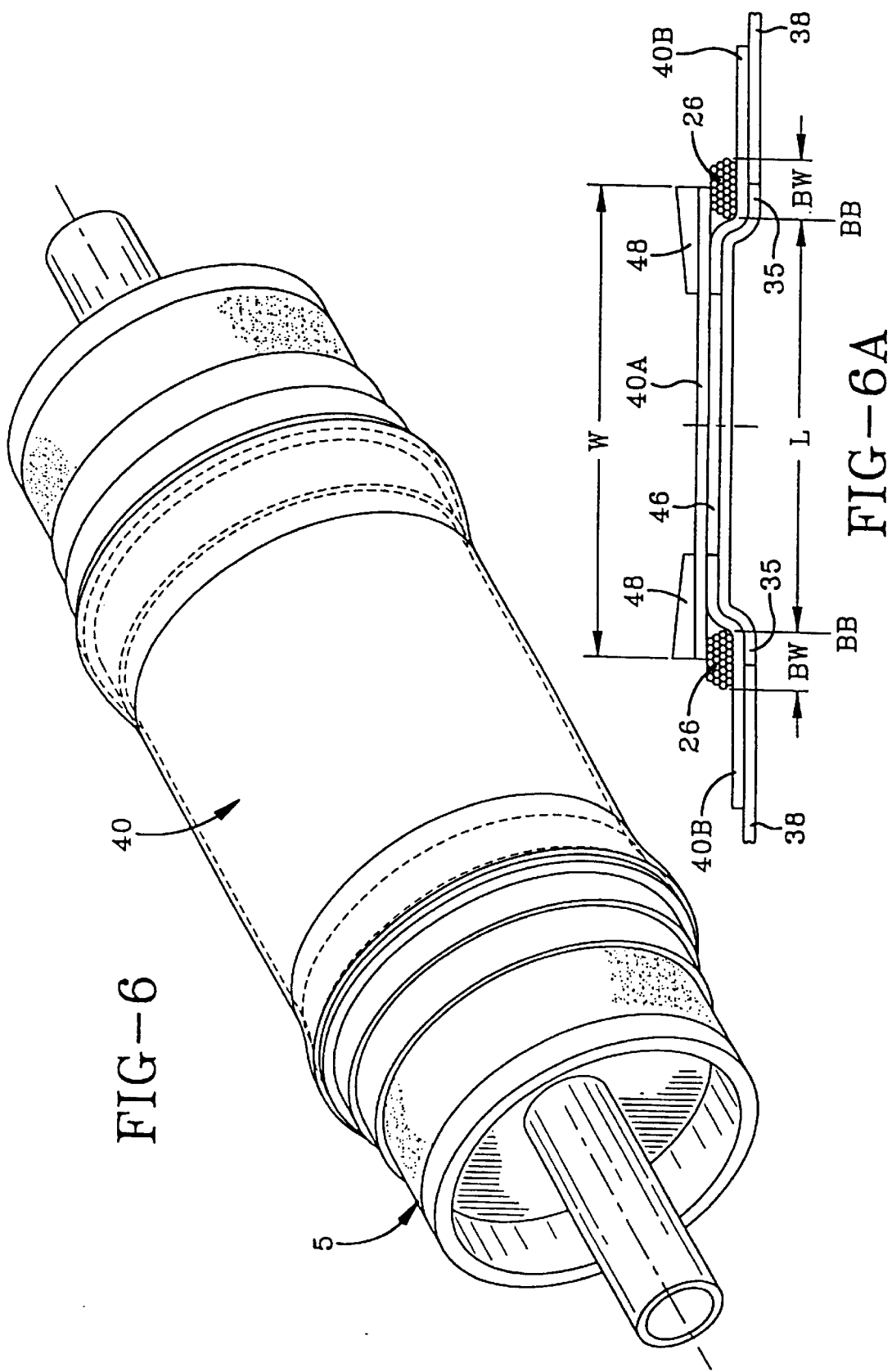

TIRE WITH COMPOSITE PLY STRUCTURE

This is a Divisional of application Ser. No. 09/627,603 filed on Jul. 28, 2000, now U.S. Pat. No. 6,358,346, which was a Divisional of application Ser. No. 09/077,646 filed May 29, 1998, now U.S. Pat. No. 6,142,205, which was a 35 USC §371 filed application of PCT Application PCT/US98/05189 filed on Mar. 13, 1998.

TECHNICAL FIELD

This invention relates to tires generally and more specifically to tires having a composite ply structure including at least one primary ply of inextensible radial extending cords, most preferably of fine diameter steel cords primarily for use in passenger pneumatic or light truck tires, including, not limited to, runflat type tires.

BACKGROUND OF THE INVENTION

The use of radial steel cords in tires is well known in the tire art, earthmover and commercial truck tires have used steel corded tires for years.

As the use of steel cords is attempted in passenger tires some common problems of how to consistently make a ply turnup of a steel cord reinforced ply must be resolved.

Historically one must first ask the question of whether or not a ply turnup is even needed.

In 1921 Charles Miller in U.S. Pat. No. 1,393,952 taught that plies could be securely anchored to the beads by means of fabric strips having crossed strands relative to the ply cords without any of the plies actually wrapping around the bead core. Miller's tires showed that as few as four plies were possible, a breakthrough for the tires of that era.

In 1942, S. M. Elliott in U.S. Pat. No. 2,430,560 reported that farm tires could be made with greater elastic deformation if the bead wrapping fabric strips did not even contact the body plies. A radical departure from what was otherwise accepted practice.

In 1968, Fred Kovac and Grover Rye of Goodyear patented a bias tire leaving an outer ply having giant cords of 0.037 inches or greater. This outer ply comprised two parts, a bias body ply and a pair of radial bead plies. The edges of the bead plies overlapped the edges of the body plies and are sandwiched between them. Kovac et al indicated that the body ply may be of wire and the bead plies may be reinforced with fabric or filament. Kovac pointedly notes that if giant cords are used in the carcass, the plies containing them are so stiff that it is difficult for the tire builder to turn them around the beads. Thus, he recommended that the edges of the stiffer plies stop short of turning under the beads and bead plies of softer fabric are turned under the beads with their edges overlapping the edges of the stiffer plies.

Powers et al. of The Firestone Tire & Rubber Company taught a radial play pneumatic tire having one or more body plies containing radially directed inextensible cords with the ply ends terminating on the same side of the bead bundle as the ply. The tire further having a bead connector ply containing radial, inextensible reinforcing cords which is wrapped about the bead bundle. Powers et al noted that a prior art British Patent No. 990,524 disclosed a radial ply body and a radial ply bead wrap, the cords of the body ply being rayon cords and the bead wrap being steel cord reinforced. Powers noted that the differences in modulus resulted in the cords not acting together as if they were one ply, whereas his all-inextensible cord design did act as one ply. Powers taught that the body ply and the bead connecting ply, where they are contiguous to one another, must be at least 20% and not greater than 50% of the peripheral distance of the body ply as measured from the midpoint of the bead bundle along the body ply to the point on the body ply where the edges of the tread ply are located. Powers suggest glass, steel or Keviar cords could be used. The Powers et al test tire was a 11–22.5 truck tire employing 1×4+6×4×0.175+1×0.15 radial cords of steel wire of a cable construction having 14 ends per inch. Similarly, the bead connector used the same steel wire construction. These truck tires carry a high operating inflation pressure of about 100 psi and the Powers et al patent demonstrated a potentially feasible concept although no known commercialization of such a truck tire had occurred.

In 1995, Ahmad et al disclosed a pneumatic tire having a discontinuous outer carcass ply. Ahmad et al disclosed a full radially inner ply with a conventional turnup end and a discontinuous outer carcass ply that extended from under the belt edges to the bead the outer ply being contiguously in contact with the outer ply.

EPO Publication 822195A2 disclose a Runflat Tire and Method which shows a runflat tire having multiple radial plies wherein at least one ply is wrapped about the bead and has a turnup, the remaining plies simply terminate near the bead. The bead area concept appears similar to the prior art solutions disclosed in Ahmad with the exception that the plies are spaced by fillers or inserts a common feature of runflat tires.

The present invention provides a novel way of creating a composite ply structure in a tire. The tire can be a radial ply pneumatic tire including the type known as runflat tires.

BRIEF DESCRIPTION OF DRAWINGS

FIG. 5 is a perspective view of the composite ply shown on a building drum being fabricated employing a first method of assembly. FIG. 5A is a cross-sectional view of the carcass made to the first method.

FIG. 6 is a perspective view of the composite ply shown being fabricated in a preferred alternative method. FIG. 6A is a cross-sectional view of the carcass made to the preferred alternative method.

SUMMARY OF INVENTION

Figure 1:
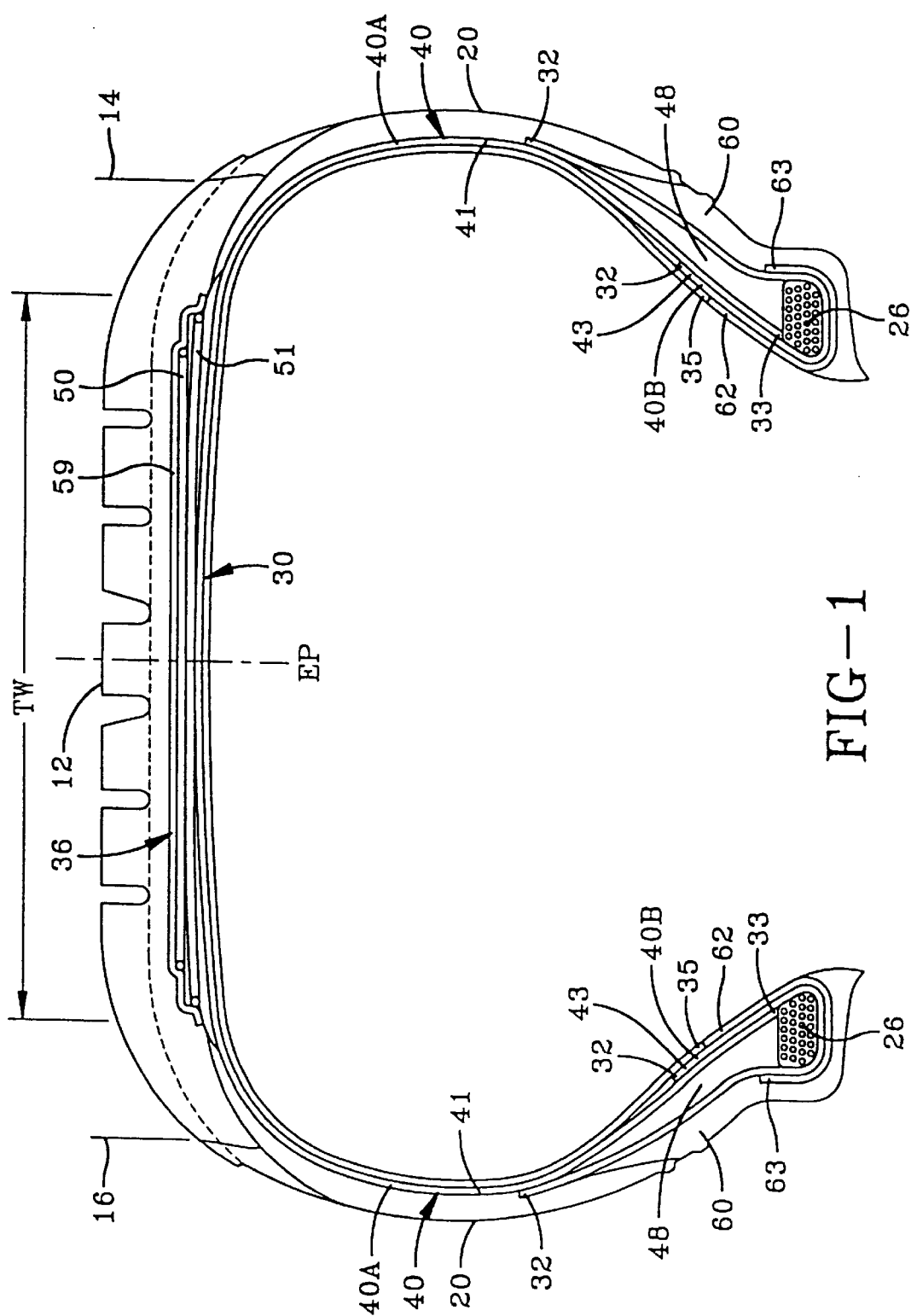
FIG. 1 is a cross-sectional view of the tire according to the invention.

A tire 10 having a tread 12, a belt structure 36 and a carcass 30 radially inward of the tread 12 and the belt structure 36 is disclosed. A carcass 30 has a pair of bead portions 22, each bead portion 22 having an elastomeric apex 48 and an inextensible bead core 26.

The carcass 30 has at least one composite ply structure 40 radially inward of the belt structure 36 and extending from and wrapping about each bead core 26. The at least one composite ply structure 40 has a primary ply 40A reinforced by cords 41 having a modulus E of X or greater, the cords 41 being radially extending and substantially inextensible extending from bead portion 22 to bead portion 22. The composite ply 40 further has a pair of ply extensions 40B reinforced by flexible cords 43. The ply extensions 40B are overlappingly joined to the primary ply 40A and wrap around the bead cores 26 and the elastomeric apex 48 extending radially outwardly.

The cords 41 of the primary ply 40A of the at least one composite ply 40 have a modulus X while the cords 43 of the ply extension 40B have a modulus less than X. The cords 43 of the ply extension 40B are substantially extensible. The cords 43 of the ply extension of the at least one composite ply 40 are preferably synthetic and are selected from a group of cords made from nylon, rayon, polyester or aramid, preferably.

The cords of the primary ply are preferably metal, most preferably steel. In one preferred embodiment of the composite ply, the primary ply has a plurality of uniformly spaced fine diameter steel cords. The cords have a diameter C in millimeters and one or more filaments. Each filament having a diameter D and preferably a tensile strength of at least $(-2,000D+4,400 \text{ MPa}) \times 95\%$, where D is the diameter of the filament in millimeters and C is less than 0.75 millimeter. An elastomeric material encapsulates this cord material; the elastomeric material has a gauge thickness in the range of the cord diameter C plus 0.22 millimeter to C plus 1.25 millimeter. Preferably, the cords are uniformly spaced at 14 epi or more per inch.

In a second embodiment of the tire according to the invention, the carcass 30 has a pair of sidewall structures 20. Each sidewall structure extending radially inwardly from the tread. Each sidewall has at least one first insert 42 radially inward of the at least one composite ply 40, a second insert 46 and a second ply 38 being spaced from the at least one composite ply 40 by the second insert 46. The second ply 38 is reinforced by radial cords 45, the cords 45 having a modulus E different from the cords of the primary ply of the at least one composite ply structure 40. The cords of the second ply 38 are made of a synthetic material preferably selected from the group of nylon, polyester, rayon or aramid.

In the preferred runflat embodiment, the inserts 42, 46 are of an elastomeric material, which may be reinforced with cords or alternatively may be reinforced with short fibers of synthetic material.

The inserts 42, 46 have a Shore A hardness in the range of 40 to 85 each insert 42, 46 may employ different hardness values. Additional three or more inserts can be used if so desired. While any insert material known in the art is usable material similar to those described in U.S. Pat. No. 5,368,082 are most acceptable as are those found in U.S. Pat. No. 5,871,600.

In one embodiment the tire has a maximum section width at a height (h) and the at least one composite ply 40 has a pair of turnup ends 32, one turnup end 32 being wrapped around each bead core 26 and extending radially to a distance of at least 40% of (h). In another embodiment, the tire has turnup ends of the at least one composite ply 40 extending radially to and laterally under the belt structure. In yet another alternative embodiment of the tire, the second ply 38 has turnup ends terminating radially below the turnup ends of the at least one composite ply structure. Alternatively the turnup ends of the composite ply structure 40 may terminate radially below the turnup ends of the second ply structure 38. In either case, at least one ply structure should have the terminal ends extending radially to a distance of at least 40% of the height (h).

The second and first inserts are of elastomeric material having a shore A hardness in the range of 40 to 85. The first insert may be different in shore hardness relative to the second insert.

In a third and fourth embodiment, the composite ply 40 has a bead wrap ply extension 40B having the cords encapsulated in elastomeric material having a predetermined cross-sectional thickness (T) as measured perpendicular between a first surface and a second surface. The cords are closer in proximity to the first surface. The second surface is adjacent to the primary ply in the region of the sidewalls.

Definitions

"Aspect Ratio" means the ratio of its section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chaffers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, undertread, over the plies, but including the beads.

"Casing" means the carcass, belt structure, beads, sidewalls and all other components of the tire excepting the tread and undertread.

"Chaffers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Ply" means a layer of rubber-coated parallel cords.

"Radial" and "radially" mean directions radially toward or away from the axis of rotation of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and Between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread Width" means the arc length of the tread surface in the axial direction, that is, in a plane parallel to the axis of rotation of the tire.

Detailed Description of the Invention

Figure 2:
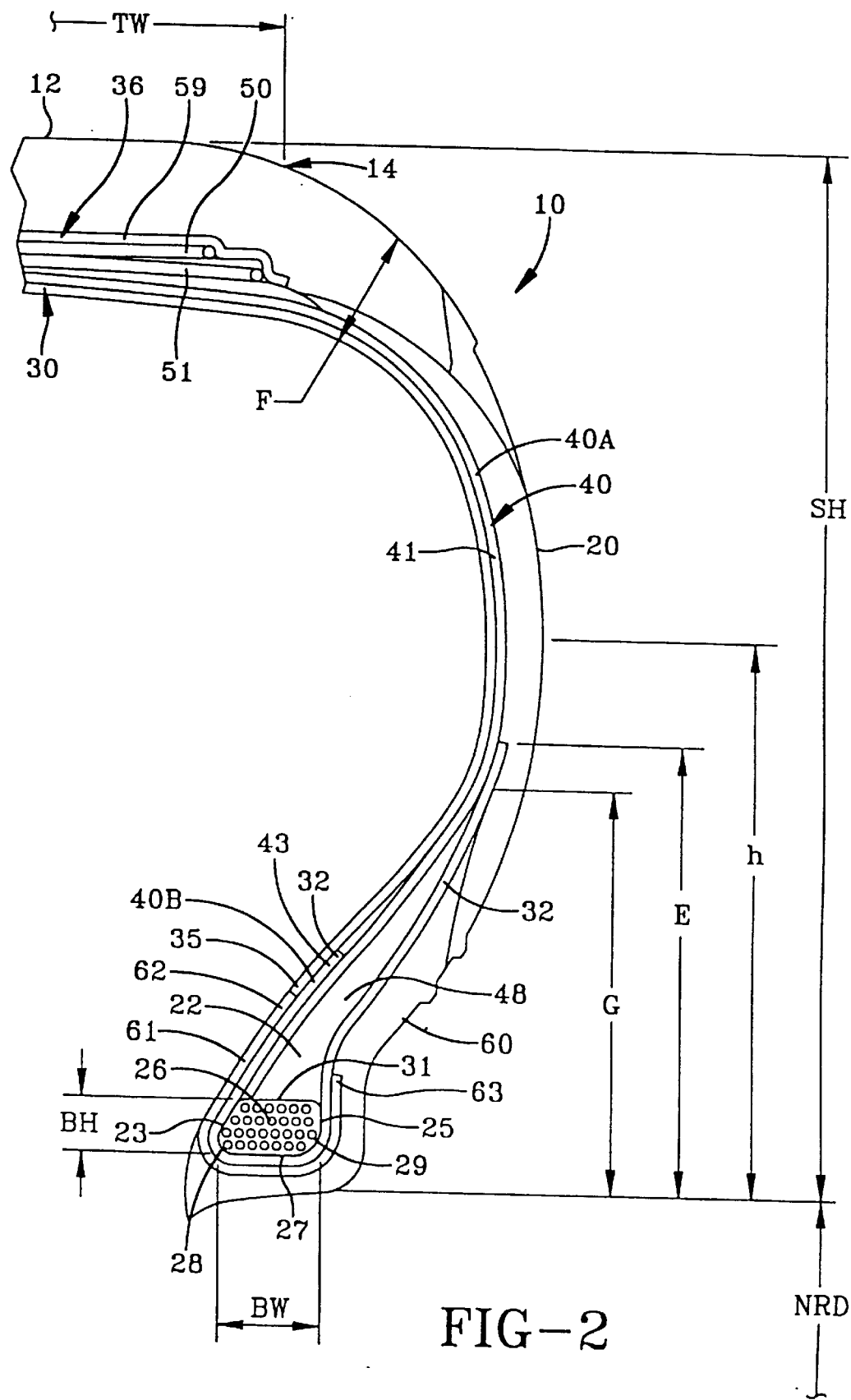
FIG. 2 is an enlarged fragmentary view of one sidewall portion of the tire of FIG. 1.

The reference numerals as depicted in the drawings are the same as those referred to in the specification. For purposes of this application, the various embodiments illustrated in the figures each use the same reference numeral for similar components. The structures employed basically the same components with variations in location or quantity thereby giving rise to the alternative constructions in which the inventive concept can be practiced. The tire 10 according to the present invention employs a unique sidewall structure 20. The tire's 10 as illustrated in FIGS. 1 and 2 are radial passenger or light truck tires; the tires 10 are provided with a grounding gauging tread portion 12 which terminates in the shoulder portions at the lateral edges 14, 16 of the tread 12 respectively. A pair of sidewall portions 20 extend from the lateral edges 14, 16, respectively, and terminates in a pair of bead portions 22, each having an annular inextensible bead core 26 respectively. The tire 10 is further provided with a carcass reinforcing structure 30 which extends from the bead portion 22 through one sidewall portion 20, tread portion 12, the opposite sidewall portion 20 to bead portion 22. The carcass structure 30 has at least one composite ply structure 40 having turnup ends 32 wrapped about the bead cores 26 respectively. The tire 10 may include a conventional innerliner 35 forming the innerperipheral surface of the tire 10 if the tire is to be of the tubeless type. Place circumferentially about the radially outer surface of the carcass reinforcing structure 30 beneath the tread portion 12 is a tread reinforcing belt structure 36. In the particular embodiment illustrated, belt structure 36 comprises two cut belt plies 50, 51 and the cords of the belt plies 50, 51 are oriented at an angle of about 23° with respect to the mid-circumferential centerplane of the tire.

The cords of the belt ply 50 are disposed in an opposite direction relative to the mid-circumferential centerplane and from that of the cords of belt ply 51. However, the belt structure 36 may comprise any number of belt plies of any desired configuration and the cords may be disposed at any desired angle. The belt structure 36 provides lateral stiffness across the belt width so as to minimize lifting of the tread from the road surface during operation of the tire in the uninflated state. In the embodiments illustrated, this is accomplished by making the cords of the belt plies 50, 51 of preferably steel and more preferably of a steel cable construction.

The carcass reinforcing structure 30 of the preferred embodiment tire 10 as shown in FIG. 1 comprises at least one composite ply structure 40. The at least one composite ply structure 40 has one primary ply 40A extending from bead portion to bead portion. The primary ply preferably has one layer of parallel cords 41; the cords 41 of the primary ply are oriented at an angle of at least 75° with respect to the mid-circumferential centerplane of the tire. Overlapping and joined to the primary ply 40A is a ply extension 40B having cords 43. The cords 43 of the ply extension 40B are oriented at an angle of at least 75° with respect to the mid-circumferential centerplane of the tire. In the particular embodiment illustrated, the cords 41 and 43 are oriented at an angle of about 90° with respect to the mid-circumferential centerplane. The cords 41 of the primary ply 40A of the at least one composite ply structure 40 are preferably made of an inextensible material such as steel, Kevlar or glass. Whereas the cords 43 may be made of any material normally used for cord reinforcement of rubber articles, for example and not by way of limitation, aramid, rayon, nylon, and polyester.

The primary ply 40B has cords 41 that are preferably substantially inextensible, the cords are synthetic or metal, more preferably metal, most preferably steel of high tensile strength. The cords 41 have modulus X. In the case of steel cords 41, the modulus is greater than 150 GPa. One way of achieving such strength is by merging the proper process and alloys as disclosed in U.S. Pat. Nos. 4,960,473 and 5,066,455, which are hereby incorporated by reference in its entirety herein, with a steel rod microalloyed with one or more of the following elements: Ni, Fe, Cr, Nb, Si, Mo, Mn, Cu, Co, V and B. The preferred chemistry is listed below in weight percentages:

| | |
|---|---|
| C | 0.7 to 1.0 |
| Mn | 0.30 to 0.05 |
| Si | 0.10 to 0.3 |
| Cr | 0 to 0.4 |
| V | 0 to 0.1 |
| Cu | 0 to 0.5 |
| Ni | 0 to 0.5 |
| Co | 0 to 0.1 |
| the balance being iron and residuals | |

The resulting rod is then drawn to the appropriate tensile strength.

The cords 41 for use in the non-runflat tire carcass 30 of FIGS. 1 and 2 may comprise from one (monofilament) to multiple filaments. The number of total filaments in the cord 41 may range from 1 to 13. Preferably, the number of filaments per cord ranges from 6 to 7. The individual diameter (D) of each filament generally ranges from 0.10 to 0.30 mm, for each filament having at least a tensile strength of 2000 MPa to 5000 MPa, preferably at least 3000 MPa.

Another critical property of the steel cord 41 is that the total elongation for each filament in the cord must be at least 2 percent over a gauge length of 25 centimeters. Total elongation is measured according to ASTM A370-92. Preferably, the total elongation of the cord ranges from about 2 percent to 4 percent. A particularly preferred total elongation ranges from about 2.2 to about 3.0 percent.

The torsion values for the steel for the filament used in the cord should be at least 20 turns with a gauge length of 200 times the diameter of the wire. Generally, the torsion value ranges from about 20 to about 100 turns, Preferably, the torsion values range from about 30 to about 80 turns with a range of from about 35 to 65 being particularly preferred. The torsion values are determined according to ASTM Test Method E 558-83 with test lengths of 200 times the diameter of the wire.

There are a number of specific metallic cord 41 constructions for use in the primary ply 40B. Representative examples of specific cord constructions include 1×, 2×, 3×, 4×, 5×, 6×, 7×, 8×, 11×, 12×, 1+2, 1+4, 1+5, 1+6, 1+7, 1+8, 2+1, 3+1, 5+1, 6+1, 11+1, 12+1, 2+7, 2+7+1, 3+9, 1+5+1 and 1+6+1 or 3+9+1, the outer wrap filament may have a tensile strength of 2500 MPa or greater based on a filament diameter of 0.15 mm. The most preferred cord constructions including filament diameters are 3×0.18, 1+5×0.18, 1+6× 0.18, 2+7×0.18, 2+7×0.18×1×0.15, 3+9×0.18+1×0.15, 3+9× 0.18, 3×0.20+9×0.18 and 3×0.20+9×0.18+1×0.15. The above cord designations are understandable to those skilled in the art. For example, designation such as 2×, 3×, 4×, and 5×mean a bunch of filaments; ie, two filaments, three filaments, four filaments and the like. Designation such as 1+2 and 1+4 indicate, for example, a single filament wrapped by two or four filaments.

The primary ply 40B has a layer of the above-described steel cords arranged so as to have from about 5 to about 100 ends per inch (≈2 to 39 ends per cm) when measured at the equatorial plane of the tire. Preferably, the layer of cords are arranged so as to have about 7 to about 60 ends per inch (≈2.7 to 24 ends per cm) at the equatorial plane. The above calculations for ends per inch are based upon the range of diameters for the cord, strength of the cord and the practical strength requirement for the ply. For example, the high number of ends per inch would include the use of a lower diameter cord for a given strength versus a lower number of ends per inch for a higher diameter wire for the same strength. In the alternative, if one elects to use a cord of a given diameter, one may have to use more or less ends per inch depending on the strength of the cord.

The metallic cords 41 of the ply 40 are oriented such that the tire 10 according to the present invention is what is commonly referred to as a radial.

The steel cord of the ply intersect the equatorial plane (EP) of the tire at an angle in the range of from 75° to 105°. Preferably, the steel cords intersect at an angle of from 82° to 98°. The preferred range is from 89° to 91°.

The ply 40 has a plurality of fine diameter cords 41 with the cord diameter C less than 1.2 mm. The cord 41 can be any of the before mentioned cords including but not limited to 1+5×0.18 mm or 3×0.18 mm or a monofilament wire having a diameter of about 0.25 mm, preferably 0.175 mm. It is considered desirable that these cords 41 have filaments having a minimum tensile strength of at least 2500 MPa and over 2.0 percent elongation, preferably about 4000 MPa and over 2.5 percent elongation.

As further illustrated in FIG. 2 the at least one composite ply structure 40 has a pair of ply extensions 40B, each having a pair of turnup end 32 respectively, which wraps about the bead core 26. The ends 34 of the ply extension are in proximity to the bead core 26 and terminate radially above and axially inward of the bead core overlapingly engaging the terminal end 33 of the primary ply 40A. In the preferred embodiment, the turnup ends 32 are located within 20% of the section height SH of the tire from the radial location (h) of the maximum section width, most preferably terminating at the radial location (h) of the maximum section width. As shown the turnup ends 32 terminate radially a distance E above the nominal rim diameter of the tire in proximity to the radial location (h) of the maximum section width of the tire. As further illustrated in FIGS. 1 and 2, the bead portions 22 of the tire 10 each have an annular substantially inextensible first and second bead cores 26 respectively. The bead cores each have a flat base surface 27 defined by an imaginary surface tangent to the radially innermost surface of the bead wires. The flat base surface 27 is a pair of edges 28, 29, and a bead width "BW" between the edges. Preferably the bead core 26 may further include a flat radially outer surface 31 extending between the first and second surfaces 23, 25 respectively. The radially outer surface 31 has a maximum height BH, the height BH is less than the width of the base BW. The cross-section defined by the surfaces 23, 25, 27 and 31 preferably are in the form of a substantially rectangular or trapezoidal cross-section.

The bead cores preferably constructed of a single or monofilament steel wire continuously wrapped. In a preferred embodiment, 0.050 inch diameter wires wrapped in layers radially inner to radially outer of 7, 8, 7, 6 wires, respectively. The flat base surfaces of the first and second bead core 26 are preferably inclined relative to the axis of rotation, and the bottom of the multi-portion of the bead is similarly inclined, the preferred inclination being about 10° relative to the axis of rotation preferably about 10.5°. This inclination of the bead base is assistance in sealing the tire and is about twice the inclination of the bead seat flange of a conventional rim and is believed to facilitate assembly and assists in retaining the beads seated to the rim.

Located within the bead region 22 and the radially inner-portion of the sidewall portions 20 are high modulus elastomeric apex fillers 48 disposed between the carcass reinforcing structure 30 and the turnup ends 32 respectively. The elastomeric fillers 48 extend from the radially outer portion of the bead cores 26 respectively, up into the sidewall portion gradually decreasing in cross-sectional width. The elastomeric fillers 48 terminate at a radially outer end at a distance G from the nominal rim diameter NRD of at least 25% of the section height SH of the tire.

In a preferred embodiment of the invention, the ply extensions 40B have parallel radially extending cords 43. Alternatively, the ply extensions 40B could have cords 43 oriented at a bias angle relative to the radial direction. The amount of and direction of orientation could range at an included angle relative to the radial direction in the range from 25° to 75°. Preferably 45° or less. It is believed the cord reinforcement of the ply extension 40B utilizing bias angled cords can be used to improve the handling characteristics of the tire when the tire is uninflated.

Figure 3:
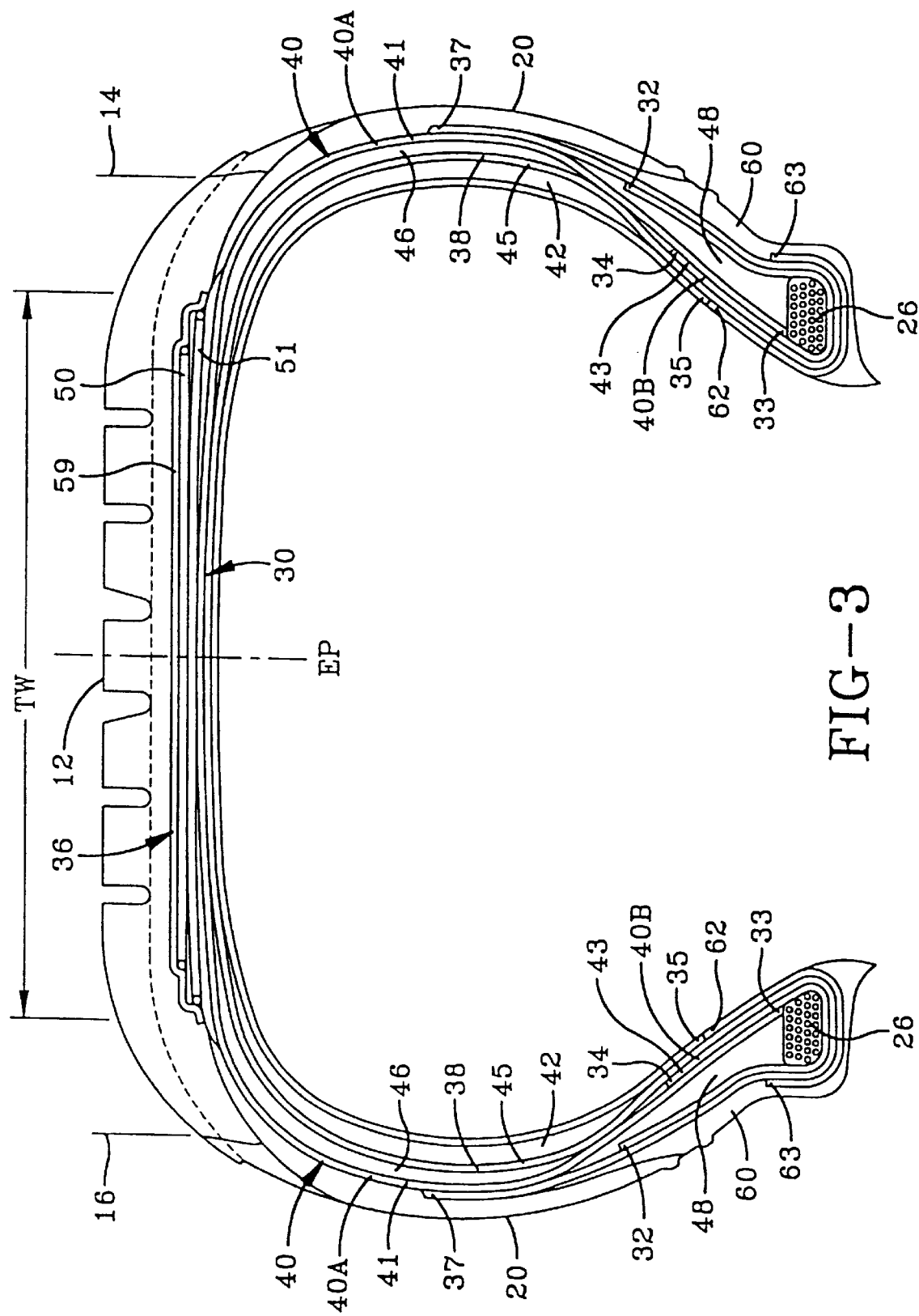
FIG. 3 is a cross-sectional view of an alternative embodiment tire according to the invention, the tire being a runflat tire.
Figure 4:
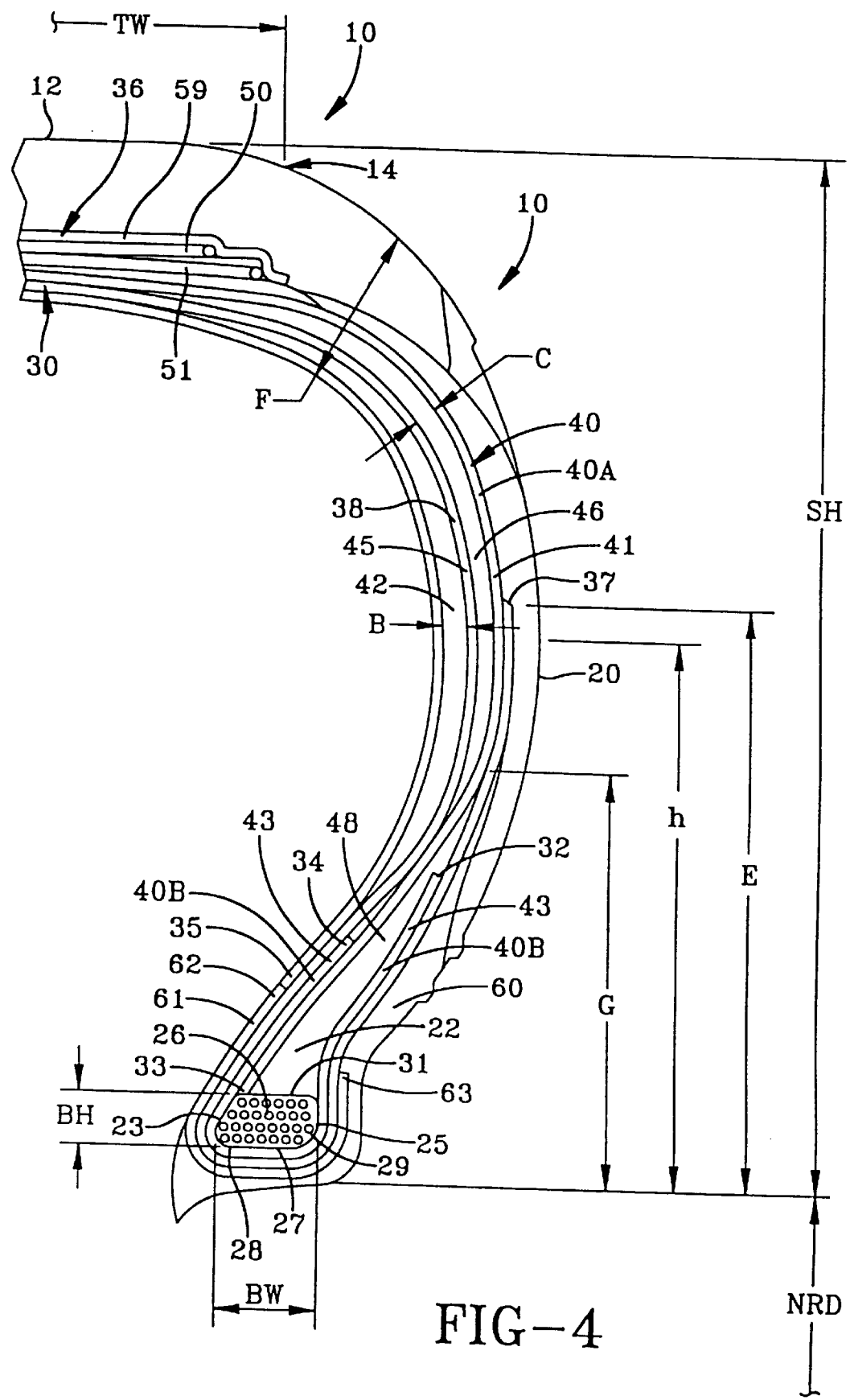
FIG. 4 is an enlarged fragmentary view of the sidewall portion of the tire of FIG. 3.
Figure 8:
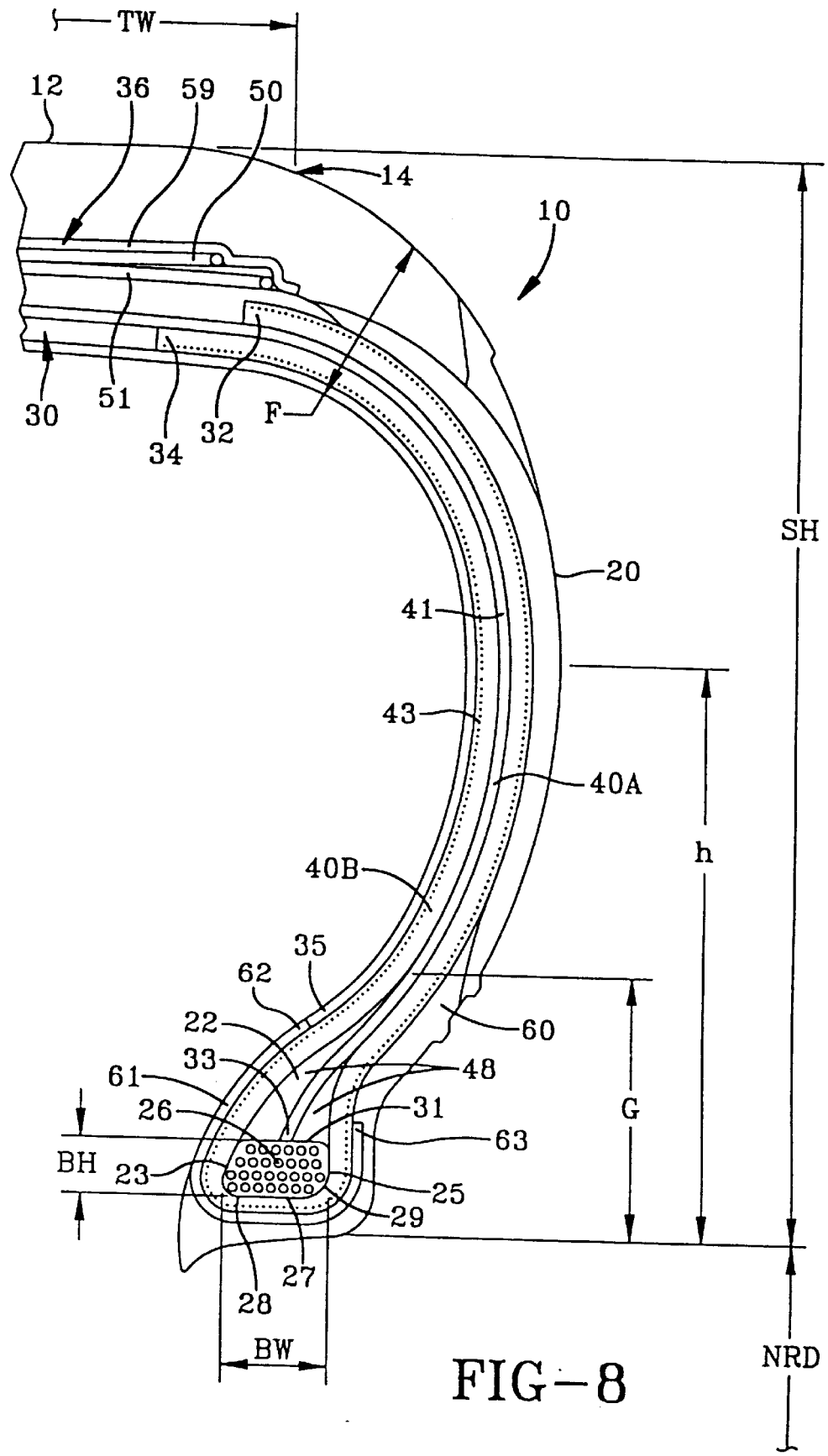
FIG. 8 is a cross-sectional view of a second alternative embodiment runflat tire.
Figure 9:
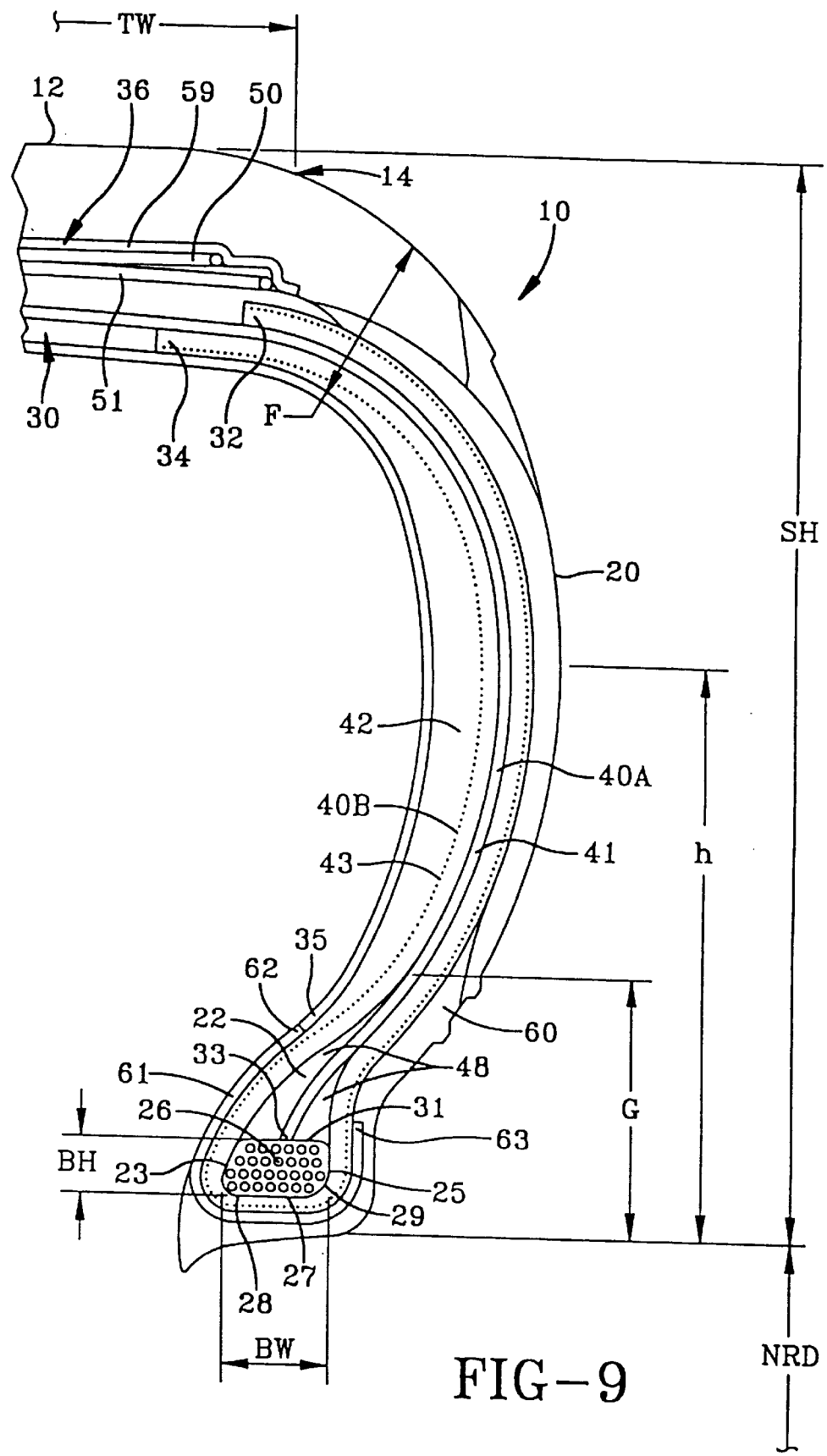
FIG. 9 is a cross-sectional view of a third alternative embodiment runflat tire.

With reference to FIGS. 3 and 4, the carcass reinforcing structure 30 of the preferred embodiment runflat tire 10 as shown in FIG. 3 comprises at least two reinforcing ply structures 38 and 40. In the particular embodiment illustrated there is provided a radially inner ply reinforcing structure 38 and a radially outer composite ply reinforcing structure 40, each ply structure 38 and 40 preferably has one layer of parallel cords extending radially from bead portion 22 to bead portion 22. The second ply reinforcing structure 38 wraps around the composite ply structure 40 and has a turnup end 37 extending radially outwardly. The second ply structure 38 preferably has synthetic cords 45 of nylon or rayon, aramid or polyester material. Whereas the composite ply 40 is precisely as earlier defined having a primary ply 40A extending from bead to bead and having inextensible cords 41 and an overlapping ply extension 40B having a synthetic cord 43 wrapping about the bead 26 and having a turnup end 32. Radially inward of the second ply reinforcing structure 38 is an elastomeric insert 42 interposed between an innerliner 35 and the ply 38. Between the ply 38 and the primary ply 40A of the composite ply 40 is an elastomeric insert 46. The cords 41 of the primary ply 40 are preferably inextensible and made of steel, whereas the cords 43 of the ply extension are preferably synthetic and made of a similar material to that of the second ply 38. The runflat tire has an unloaded and inflated section height of SH. When normally inflated, but statically loaded, the tire deflects yielding a loaded height of about 75% or less of SH. When the tire is uninflated and similarly statically loaded, the tires section height is 35% or greater of SH. This class of tires generally have thicker sidewalls as shown in FIGS. 4, 8 and 9. Such tires can employ a composite ply having inextensible cords 41 having filaments of a diameter from 0.05 to 0.5 mm, preferably 0.25 to 0.4 mm. Such cords 41 are preferably metalic, made of steel, but are not limited to very high tensile steel cords of pneumatic tires without runflat capability. This is made possible because the thickened sidewalls limit the flexure flatique or bending fatique of the cords 41 enabling more rigid cords to be employed. This has the advantage of increasing the tires load carrying capacity while lowering the tires cost. This construction has many similarities to U.S. Pat. No. 5,871,600 which is incorporated in its entirety herein by reference. In that application, it was pointed out that the bending modulus of the sidewall structure could be moved to be substantially adjacent to the inextensible cords 41 of the ply structure 40. By attaching an overlapping synthetic cord 43 as a ply extension 40B, which wraps around the bead portion, the tire engineer is now able to tune or adjust the performance of the tire so that in the bead area 22 the substantially more compliant synthetic material is effectively wrapped around the beads providing for easier assembly and an ability to adjust the ride performance of the vehicle by raising or lowering the transition between extensible and inextensible ply cords. By doing that, the engineer is able to adjust the radial location of the overlap between the extensible and inextensible cords so that the tire can act more like a composite having primarily synthetic cords in the lower bead region or he can adjust the stiffness by lowering the inextensible cords to adjacent the bead area to increase the stiffness of the bead portion.

With reference to FIG. 5, there is shown a perspective view of the composite ply 40 shown on a building drum 5. The composite ply 40 has the ply extensions 40B preattached to the primary ply component 40A. The bead cores 26 are then placed over the ply extensions to an area approximately axially adjacent the primary ply on each side of the tire as shown. As the tire carcass is inflated, the ply extensions 40B hold the primary ply 40A near the proximate location relative to the bead core 26. FIG. 5A shows the cross-sectional view of the features described above.

FIG. 6 is a perspective view of the composite ply 40 shown being fabricated in an alternative method. As shown the ply extension 40B is placed on each side of the building drum with the bead core 26 placed directly on top of and approximately centered on each ply extension 40B, preferably the ply extension 40B and the bead core 26 are placed in a shallow depression on each side of the building drum 5. The primary ply 40 is then laid flat or substantially flat overlying the bead cores 26 as shown in cross-sectional view 6A. The width W of the primary ply 40 is cut such that the primary ply width is within the range of the distance L between the bead cores 26 axially inner sides 23 and their axially outer sides 25. Preferably, the width W of the primary ply 40A is set to approximate the spacing between the midpoint of the two bead cores 26, thus W equals L+BW ideally. As the tire is inflated during the building process and the ply extensions 40 are turned up to adjoin a primary ply 40A, the primary ply 40A is drawn radially inward in the lower area such that the end 33 of the primary ply 40A slides across the top 31 of the bead core 26 and positions itself preferably adjacent the bead core 26 and the ply extension 40B at the location directly adjacent the radially outer portion 31 of the bead core 26. It is believed this method of fabrication insures that the primary ply cords 41 are of a maximum cord length relative to the bead-to-bead location as measured around the peripheral distance of the tire.

A particularly useful feature of the assembly method shown in FIG. 6 is that when the building drum is recessed, it is possible to slip the bead cores onto the drum 5 and over the ply extension 40B without having to clear the apex filler 48 or the inserts because the primary ply lays over the bead cores 26. The inserts 46 can be installed onto the carcass structure after the beads are set, then the apex filler 48 and the inserts 46 can be stitched to the assembly after which the primary ply can be overlaid and cylindrically spliced to the assembly. The bead cores 26, as can be easily appreciated from FIGS. 5 and 5A can be slipped over the ply extensions 40B and the liner 35 from one end of the building drum if so desired or both ends in either case without having to pass over the primary ply 40. A similar advantage is achieved with the runflat carcass assembly of FIGS. 7A, 7B, 7C.

As can be seen from both FIGS. 5 and 6, the resulting constructions are fundamentally the same with the advantage of the method employed in FIG. 6 providing the ability to lower the end 33 the primary ply component 40A to a location closes to the bead during the inflation blow-up forming of the finished tire.

The use of an inextensible cord 41 in the primary ply 40A insures the ply as it is being inflated on the building drum will act like a preloaded spring forcing the end 33 to reliably and consistently snap into proper position along side or in proximity to the bead core. In an alternative construction, the ply width W can be set to L+greater than 2BW. That construction can insure the primary ply ends 33 are located alongside the axially outer surface 23 of the bead core 26.

It is understood by those of ordinary skill in the art that the method of forming the tire as shown in FIGS. 5 or 6 can be employed on the inventive tire FIGS. 1 and 2 or alternatively the runflat tire FIGS. 3 and 4 without significant modification.

With reference to FIGS. 8 and 9 cross-sectional views of a second and third alternative embodiment tires 10 are shown. In the second embodiment tire 10, the ply extension of the composite ply 40B is fabricated in a unique manner. As shown both the radially inner end 34 and the radially outer end 32 of the ply extension 40B extend a distance approximately under the belt reinforcing structure 36. The ply extension 40B as shown has a predetermined cross-sectional thickness T, the ply cords 43 are placed adjacent one surface as opposed to the opposite surface resulting in a asymmetric location of the cords 43 such that a large amount of elastomeric material is on one side of the cords 43 with virtually none on the opposite side of the cords 43.

During the fabrication of this tire, the ply extensions 40B are laid on the building drum and extend substantially wider on either side of the bead core 26. The width is sufficient so that as the tire is inflated, the ends 32, 34 will terminate under the belts 50, 51. The primary ply 40A is laid between the bead cores 26 as shown. As the tire 10 is inflated and the ply extension 40B is turned up, the tire cross-section results as shown in FIG. 7. Preferably, the elastomeric 40B ply coat for the ply extension is similar in composition to the insert fillers 42, 46 previously discussed. As the ply extension turns up, it forms two insert fillers material and apex filler from the thickened area of the ply coat. The primary ply is sandwiched and interposed between both ends 32, 34 of the radially extending ply extension, the resultant tire is a runflat tire wherein the apex filler and inserts were cleverly replaced by being incorporated into the ply extension 40B. As can be easily appreciated by those of ordinary skill in the art, this tire greatly reduces the number of components used in the manufacture and assembly of a runflat tire greatly improving both the speed and accuracy at which the tire can be manufactured. The cords 41 of the primary ply preferably are inextensible but could be any of the cord materials described including nylon, rayon, polyester, etc.

If a higher effective tire spring rate is needed the tire of FIG. 8 may further include inserts 42 located radially inward and adjacent to the ply extension 40B as shown in FIG. 9. This third alternative embodiment runflat tire has a great load carrying capacity at O inflation pressure. As shown, the primary ply 40A can be located somewhat centered above the bead core 26 by applying additional apex filler 48 in two parts on each side of the primary ply 40A. Alternatively, if a single filler 48 is employed, the primary ply 40A can be contiguous with the ply extension 40B as shown in FIG. 4 or the primary ply 40A can be contiguous with the turnup portion 32 of the ply extension 40B, if the apex filler 48 is positioned below the primary ply during assembly.

Figure 7A:
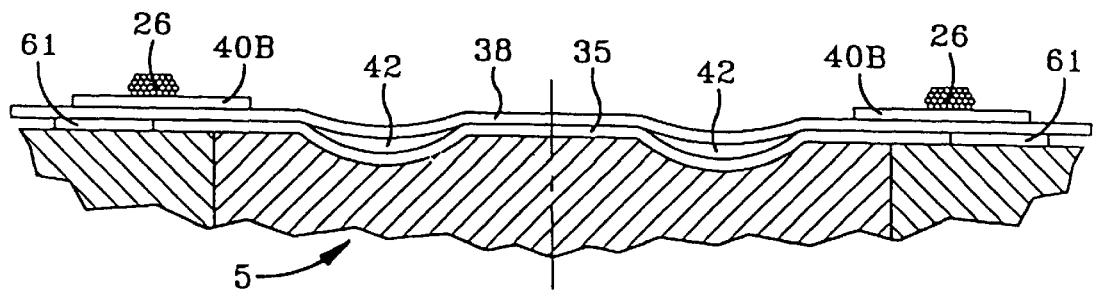
FIGS. 7A, 7B, and 7C are schematic views of the runflat tire carcass of FIG. 4 being made according to the method of FIG. 6.
Figure 7B:
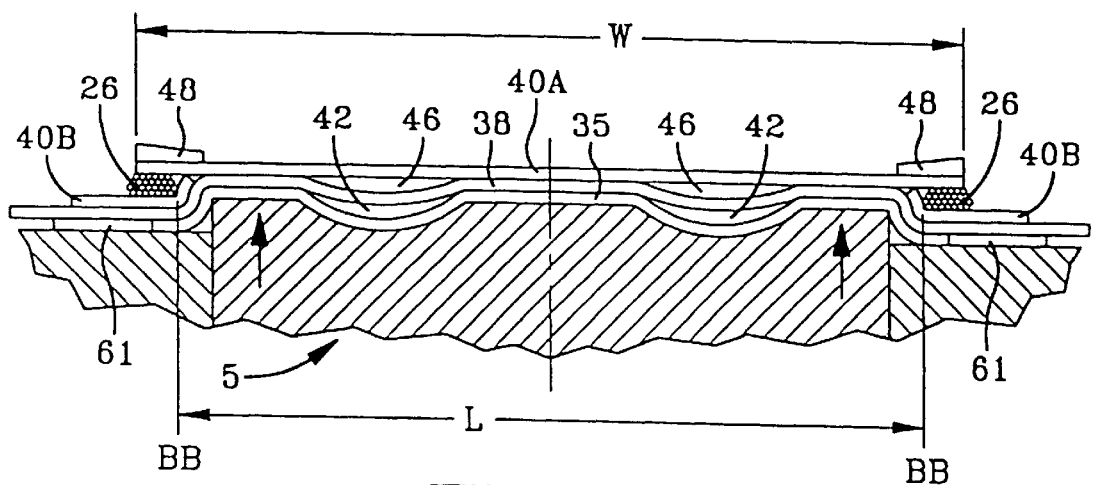
Figure 7C:
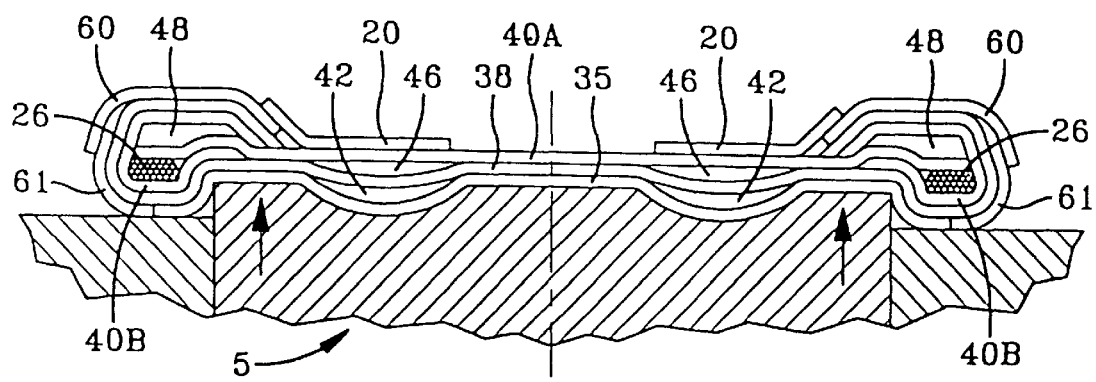

When assembling the runflat tire of FIG. 4 with a composite ply 40, the preferred method includes the steps of providing a building drum 5 having a contoured profile as shown in the cross-sectional view of FIGS. 7A, 7B and 7C applying the liner 35, a toe guard of fabric material (optionally), the first inserts 42 and the ply 38 with synthetic cords overlaying the previously mentioned components. Then the ply extensions 40B are placed over the ply 38 approximately centered at the planes B—B, the planes B—B being the planes defining the spacing L between the bead cores 26. Then one bead core 26 is placed at each plane B—B. It is important to note that the bead cores 26 can slide over the carcass structure without impediment because of the drum contours and the inside diameter of the bead cores. This means the cores 26 can freely be slide over the entire structure from either end of the building drum or the beads 26 can be installed from both ends, if desired.

When the beads 26 are installed, the crown drum expands setting the beads location. The insert fillers 46 are then applied. Then the primary ply 40A is placed over the inserts and stitched to the underlying components. It is important to note that the primary ply 40A has a width W equal to greater than the bead core spacing L, preferably L+ the bead core width BW, most preferably the distance L plus two times the bead core width BW, then the apex fillers 48 are attached preferably directly over the ends of the primary ply 40A. The carcass then has the turnups of the ply 38 and the extension 40B folded up and stitched to the carcass. Then belt wedge gums strips and the chaffer and sidewall components, 60, 20 are attached. The carcass is then inflated to a toroidal shape and as the tire 10 is being shaped, the primary ply 40A slides across the bead cores 26 to the axially inner location of the bead cores 26 contiguously joining itself to the ply extensions 40B as previously discussed. Then the belt layers 50, 51 and the overlay 59 (if used) is applied as well as the tread 12, thus completing the assembly of the green tire 10.

In the preferred embodiment tire 10 of FIGS. 3 and 4, the overlay 59 is wound spirally over the belts in three layers to enhance the stiffness of the tread when the tire is operated in the runflat condition.

It will be appreciated by those of ordinary skill in the art the chaffing of the tires as shown in the lower bead region radially outward of the carcass structure 30 adjacent the rim flange may be minimized, especially during the use in uninflated condition by providing a hard rubber chaffer portion 60. Furthermore, it is appreciated by those of ordinary skill in the art that high-speed performance of the tires shown can be enhanced by the addition of fabric overlays 59, including, but not limited to, nylon or aramid overlays either in fabric plies or in strips. This is known in the art.

What is claimed is:

1. A runflat tire, the tire having an unloaded and inflated section height of SH, a normally loaded inflated static section height of 75% or less and an uninflated normally loaded static section height of 35% or greater, the tire being characterized by a tread, a belt structure, and a carcass radially inward of the tread and the belt structure, the carcass having a pair of bead portions, each bead portion having an elastomeric apex and an inextensible bead core, the carcass comprising:

at least one composite ply structure radially inward of the belt structure and extending from and wrapping about each bead core, the at least one composite ply structure having a primary ply reinforced by parallel cords having a modulus E of X or greater, the cords being radially extending and substantially inextensible, extending from bead portion to bead portion, and a pair of ply extensions reinforced by flexible cords, the ply extensions being overlappingly joined to the primary ply and wrapping about the bead core and elastomeric apex and extending radially outwardly.

2. The runflat tire of claim 1, wherein the substantially inextensible cords of the composite ply have filaments of a diameter from 0.05 mm to 0.5 mm.

3. The runflat tire of claim 2, wherein the filament diameter is in the range of 0.25 mm to 0.4 mm.

* * * * *